US 6,922,264 B2

(12) United States Patent
Lin

(10) Patent No.: US 6,922,264 B2
(45) Date of Patent: Jul. 26, 2005

(54) FIXING SEAT OF MAIN TRANSMISSION SHAFT OF SCANNER

(75) Inventor: Jim Lin, Hsin-Chu (TW)

(73) Assignee: Foxlink Image Technology Co., Ltd., Hsin-Chu (TW)

( * ) Notice: Subject to any disclaimer, the term of this patent is extended or adjusted under 35 U.S.C. 154(b) by 735 days.

(21) Appl. No.: 09/950,606

(22) Filed: Sep. 13, 2001

(65) Prior Publication Data

US 2003/0048489 A1 Mar. 13, 2003

(51) Int. Cl.⁷ ............................................... H04N 1/04
(52) U.S. Cl. ...................................... 358/497; 358/474
(58) Field of Search ............................... 358/497, 494, 358/474, 471, 487, 401, 400, 500, 505, 506, 512–514, 501; 399/211, 110; 248/667; 403/187, 255, 230, 410; 347/245, 263; 250/239, 234–236; D14/462, 471

(56) References Cited

U.S. PATENT DOCUMENTS

| 5,900,951 | A | * | 5/1999 | Tsai | 358/497 |
| 6,091,516 | A | * | 7/2000 | Chang et al. | 358/474 |
| 6,426,823 | B1 | * | 7/2002 | Hsiao et al. | 359/196 |

* cited by examiner

Primary Examiner—Cheukfan Lee
(74) Attorney, Agent, or Firm—Rosenberg Klein & Lee

(57) ABSTRACT

The present invention provides a fixing seat of main transmission shaft of a scanner, wherein a conical hole is formed on the surface of a main transmission shaft whereon a scanning head can move, and a belt conveyor is used to wind around a timing pulley and an idle pulley. The timing pulley is driven to rotate by a motor device so that the belt conveyor can drive the scanning head to move on the main transmission shaft. One end of an axis of the timing pulley protruding out of the surface thereof forms a slanting conical end, which is fixed in the conical hole. The present invention has the advantages of high stability, good reliability, and a low manufacturing cost.

2 Claims, 7 Drawing Sheets

FIXING SEAT OF MAIN TRANSMISSION SHAFT OF SCANNER

FIELD OF THE INVENTION

The present invention relates to a fixing seat of main transmission shaft of a scanner and, more particularly, to a fixing seat of main transmission shaft having high stability and a low manufacturing cost.

BACKGROUND OF THE INVENTION

Along with progress of information technology, office automation has become a trend. In addition to using computers for processing and storage of large quantities of data, using scanners as output devices of data such as documents, tables, and images can also effectively enhance the efficiency of inputting data. In order to avoid bad situations such as distortion of data inputted into a scanner during the scanning process, the optical path of a scanning head of the scanner must be kept constant. Therefore, requirement of transmission stability of a scanner's transmission mechanism is very high.

As shown in FIG. 1, in a fixing seat of main transmission shaft of a conventional transmission mechanism, a bearing plate 14 is disposed on a motor device 12. A plurality of screws 16 are used to fixedly lock the bearing plate 14 on a scanner bottom seat 18. A timing pulley 20 is pivotally disposed on the bearing plate 14. The timing pulley 20 is driven to rotate by the motor device 12. A belt 22 is used to wind around the timing pulley 20 and an idle pulley 24 so that a scanning head (not shown) can be driven to move by means of transmission of the belt 22.

When the above belt 22 moves, the axis of the timing pulley 20 will bear the entire tension of the belt 22 to easily generate torsion effect. Moreover, the bearing plate 14 is generally fixed on the bottom seat 18 made of plastic, as shown in FIG. 2. When the bottom seat 18 is softened by high temperature due to long-time operation of the belt 22, the axis of the timing pulley 20 pivotally disposed on the bearing plate 14 will easily deform to reduce the tension of the belt 22, hence affecting stability of motion of the scanning head to deteriorate resolution quality of image. On the other hand, in order to let the timing pulley 20 on the bearing plate 14 keep stable when being operated, more screws 16 are required to steadily and exactly lock the bearing plate 14 on the scanner bottom seat 18, hence resulting in a higher production cost.

Accordingly, in consideration of the above problems, the present invention proposes a fixing seat of main transmission shaft of a scanner having high stability and a low manufacturing cost.

SUMMARY OF THE INVENTION

The primary object of the present invention is to propose a fixing seat of main transmission shaft of a scanner having high stability and good reliability to secure scanning quality of image of the scanner.

Another object of the present invention is to propose a fixing seat of main transmission shaft of a scanner to reduce the cost of material.

According to the present invention, a fixing seat of main transmission shaft comprises a main transmission shaft so that a scanning head can move thereon. A conical hole is formed on the surface of the main transmission shaft. A bearing plate is disposed at the top end of a motor device. A timing pulley is pivotally disposed on the bearing plate. The timing pulley is driven to rotate by the motor device. A belt conveyor is used to wind around the timing pulley and a distant idle pulley, thereby driving the scanning head to move on the main transmission shaft. One end of the axis of the timing pulley protruding out of the surface thereof forms a slanting conical end, which is fixed in the conical hole.

The various objects and advantages of the present invention will be more readily understood from the following detailed description when read in conjunction with the appended drawing, in which:

DETAILED DESCRIPTION OF THE PREFERRED EMBODIMENTS

The present invention is characterized mainly in that one end of the axis of a timing pulley is fixed on a main transmission shaft whereon a scanning head moves, thereby enhancing operational stability of the timing pulley.

Figure 1:
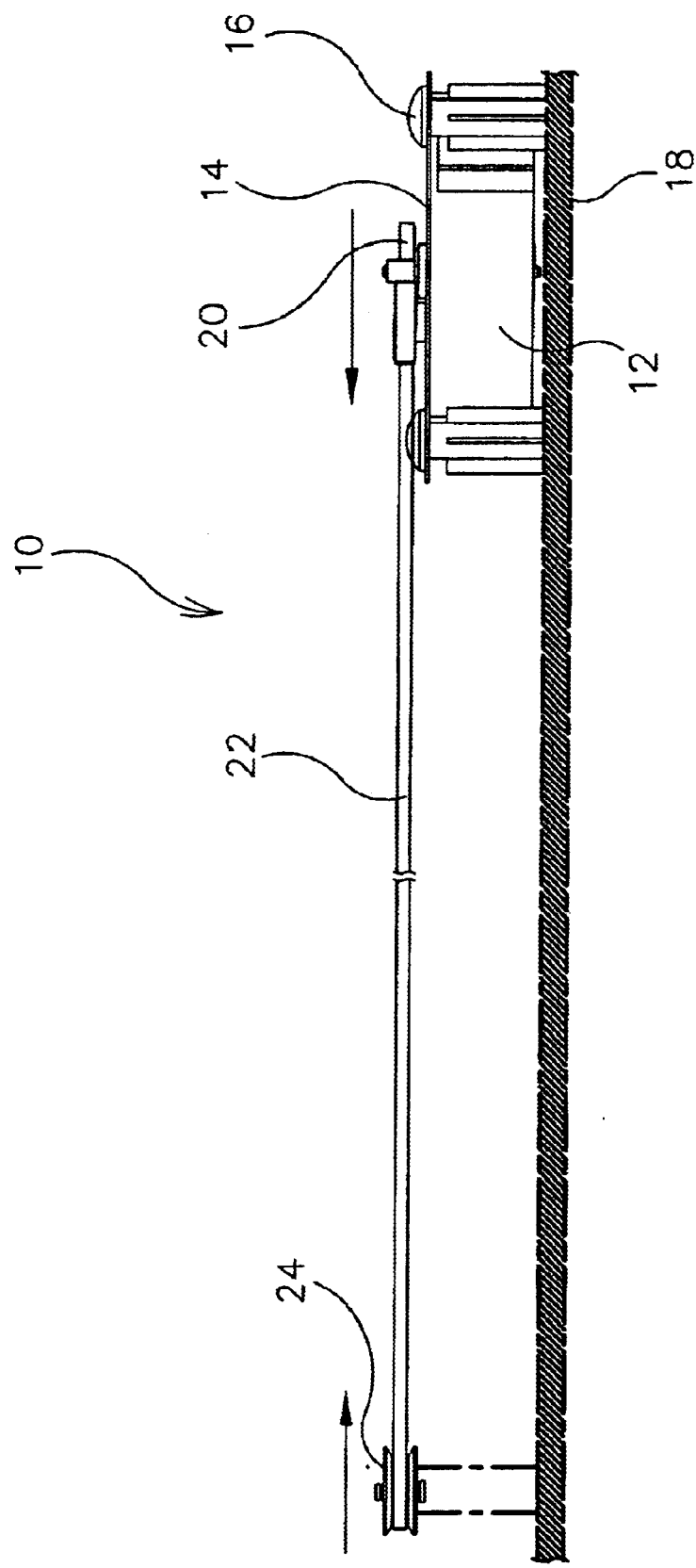
FIG. 1 is a cross-sectional view of a fixing seat of main transmission shaft of a prior art scanner.
Figure 2:
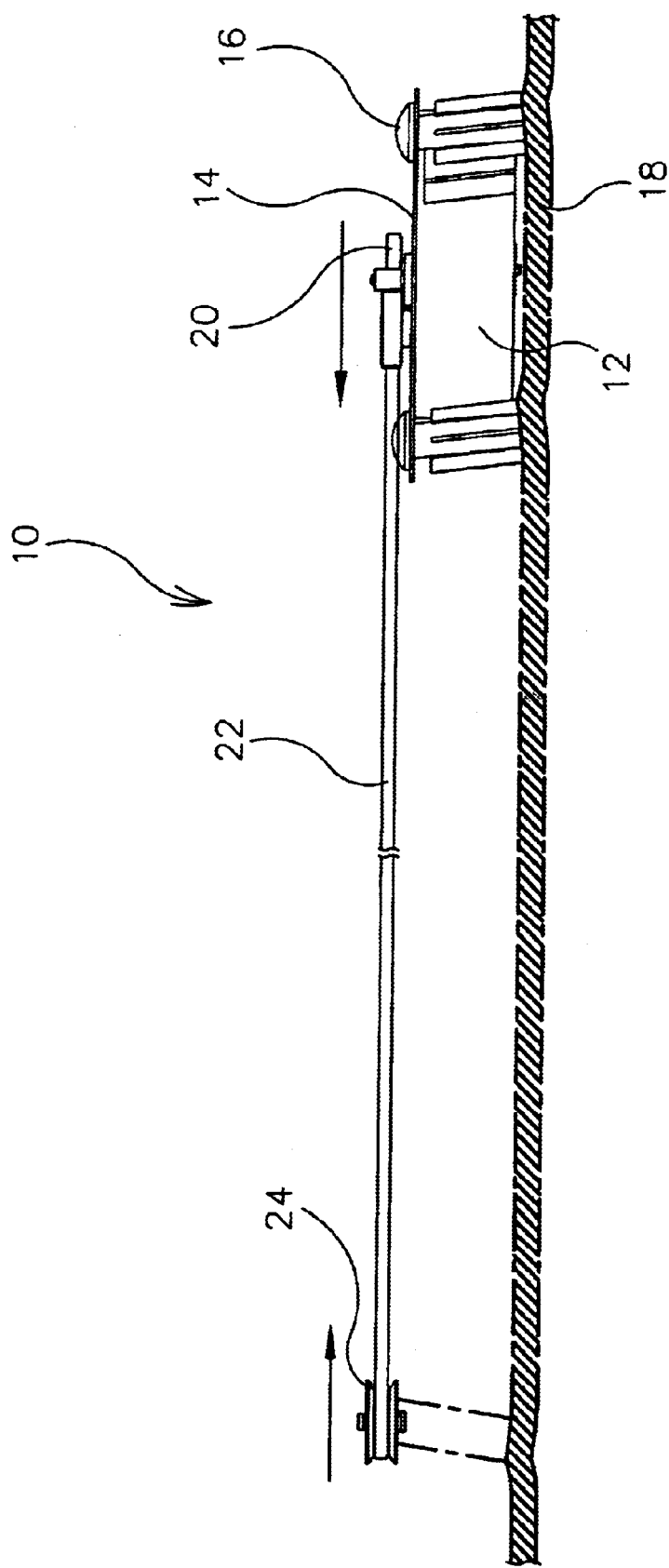
FIG. 2 is a diagram showing deformation of the axis of a timing pulley in the prior art.
Figure 3:
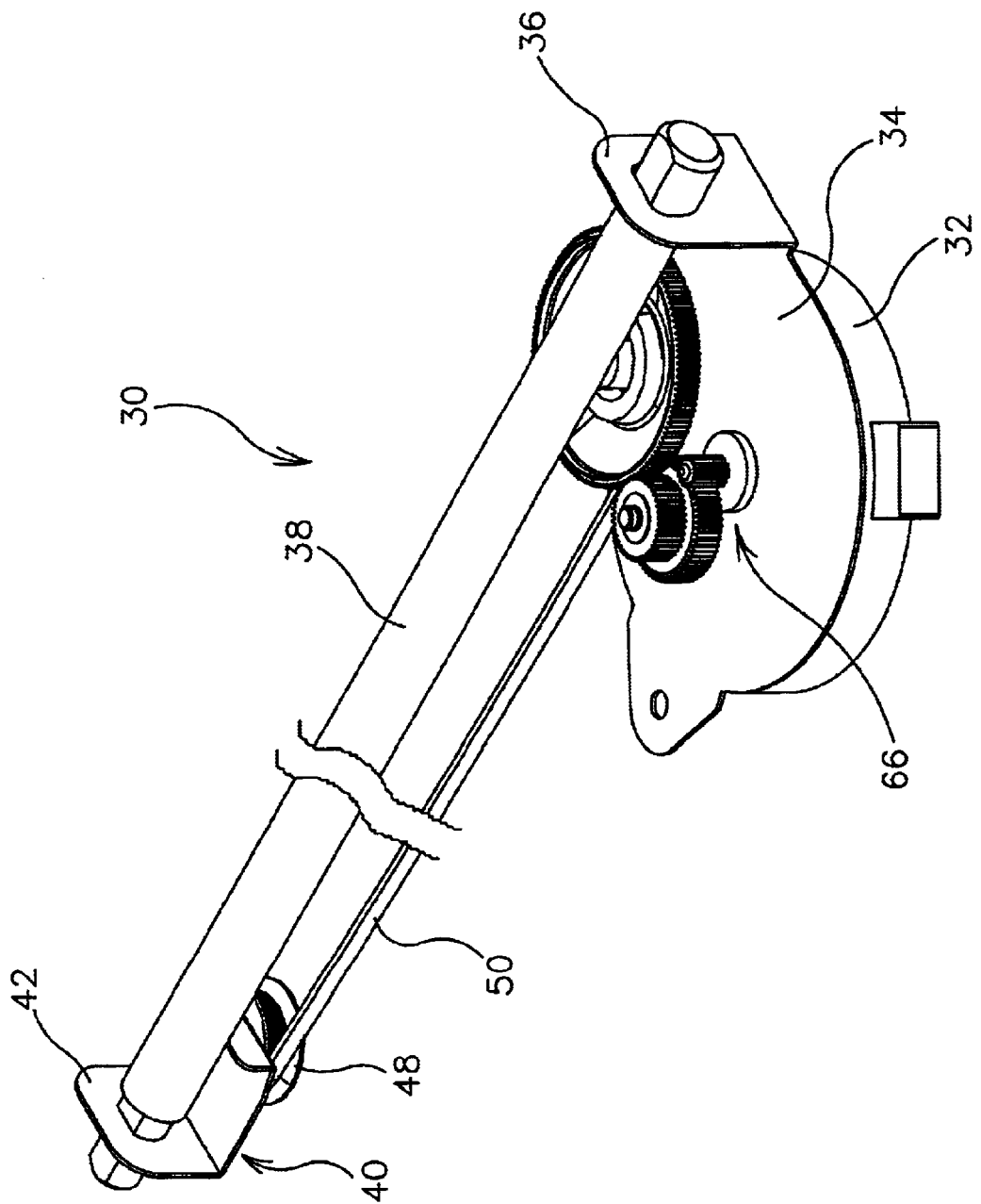
FIG. 3 is a perspective view of the present invention.
Figure 4:
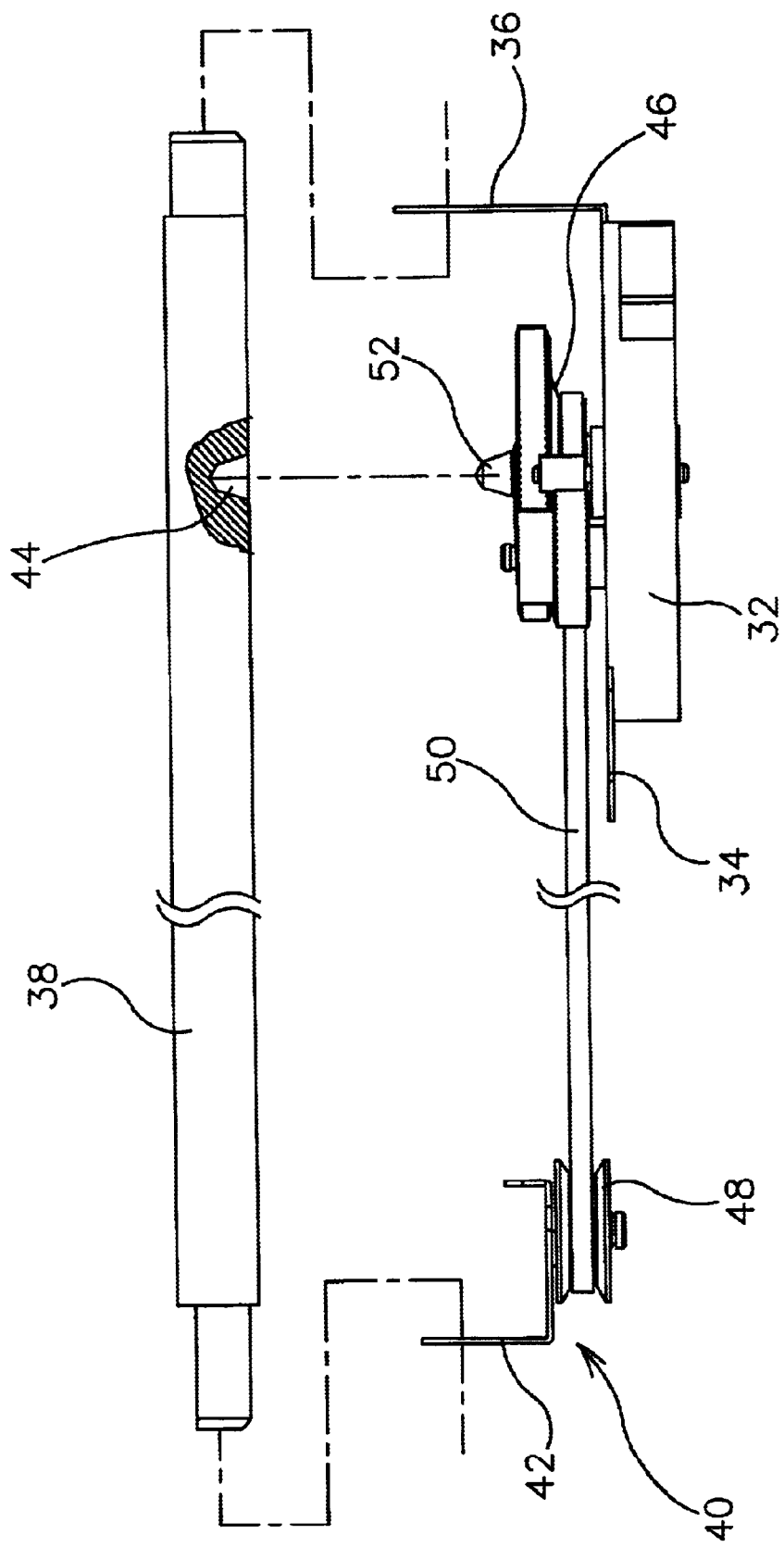
FIG. 4 is a partly exploded cross-sectional view of the present invention.
Figure 5:
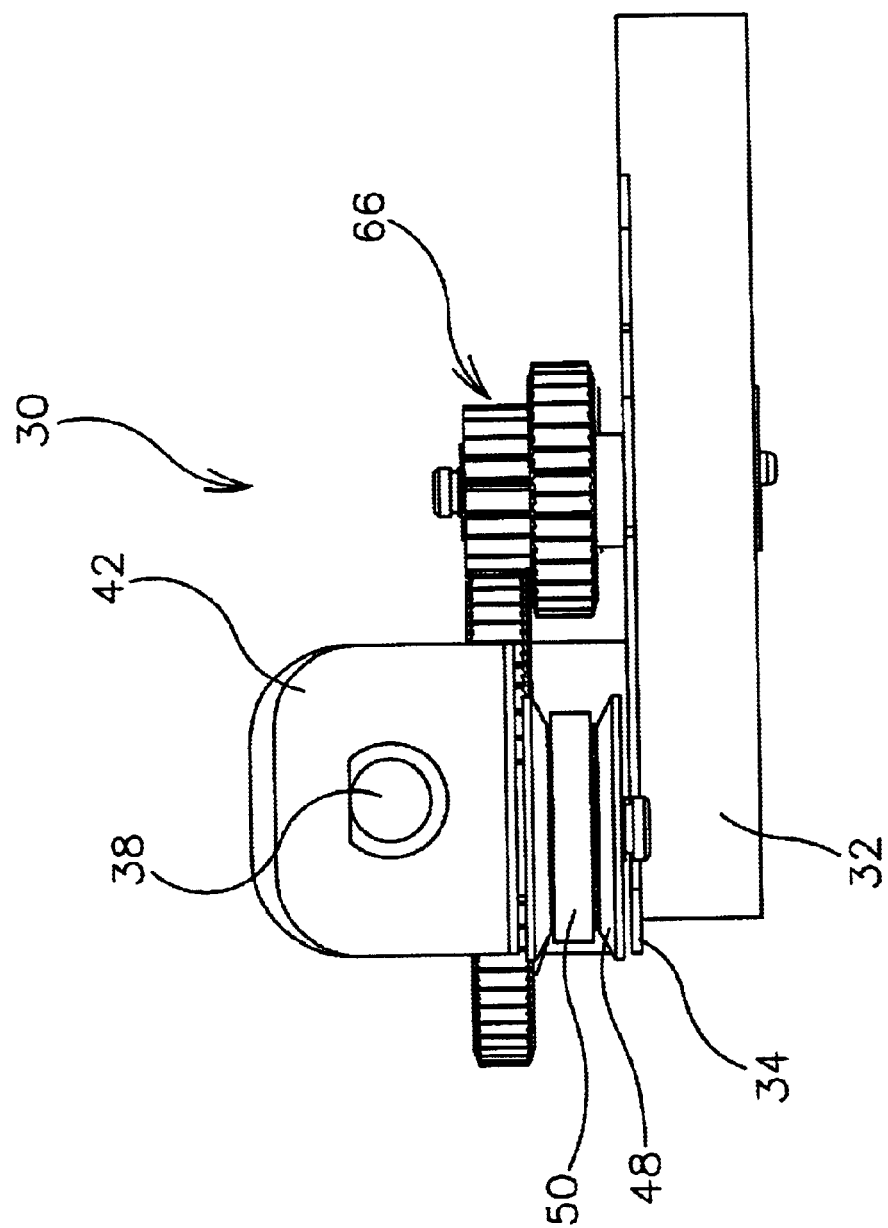
FIG. 5 is a side view of FIG. 3.

As shown in FIGS. 3, 4, and 5, a fixing seat of main transmission shaft 30 comprises a power source, generally being a motor device 32. A bearing plate 34 is fixedly disposed on a top face of the motor device 32. One side of the bearing plate 34 forms a bent portion 36. One end of a main transmission shaft 38 horizontally penetrates the bent portion 36, and the other end thereof penetrates a vertical portion 42 of an L-shaped fixing rack 40 so that a scanning head (not shown) can move to and fro on the main transmission shaft 38. A conical hole 44 is formed at one end of the surface of the main transmission shaft 38. A timing pulley 46 and an idle pulley 48 are pivotally disposed on the surface of the bearing plate 34 and the bottom face of the L-shaped fixing rack 40, respectively. The timing pulley 46 is driven to rotate around the axis thereof by the motor device 32. A belt conveyor 40 winds around the timing pulley 46 and the idle pulley 48. The belt conveyor 50 is used to drive the scanning head to move on the main transmission shaft 38. One end of the axis of the timing pulley 46 protruding out of the surface thereof forms a slanting conical end 52, which is fixed in the conical hole 44 of the main transmission shaft 38.

A deceleration gear set 66 is disposed on the bearing plate 34 to subduedly transfer power of the motor device 32 to the timing pulley 46.

Figure 6:
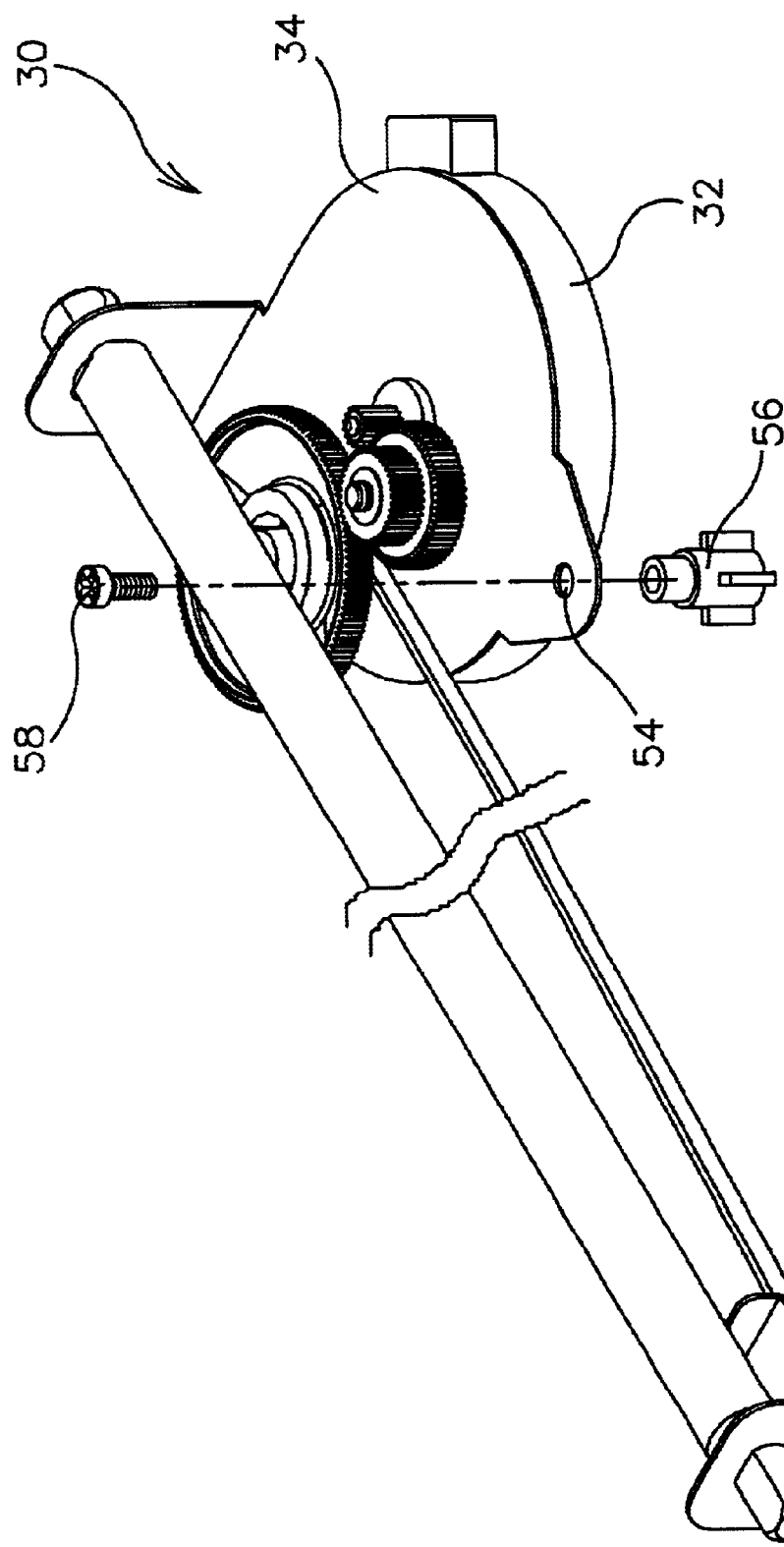
FIG. 6 is a positioning diagram of a bearing plate of the present invention.
Figure 7:
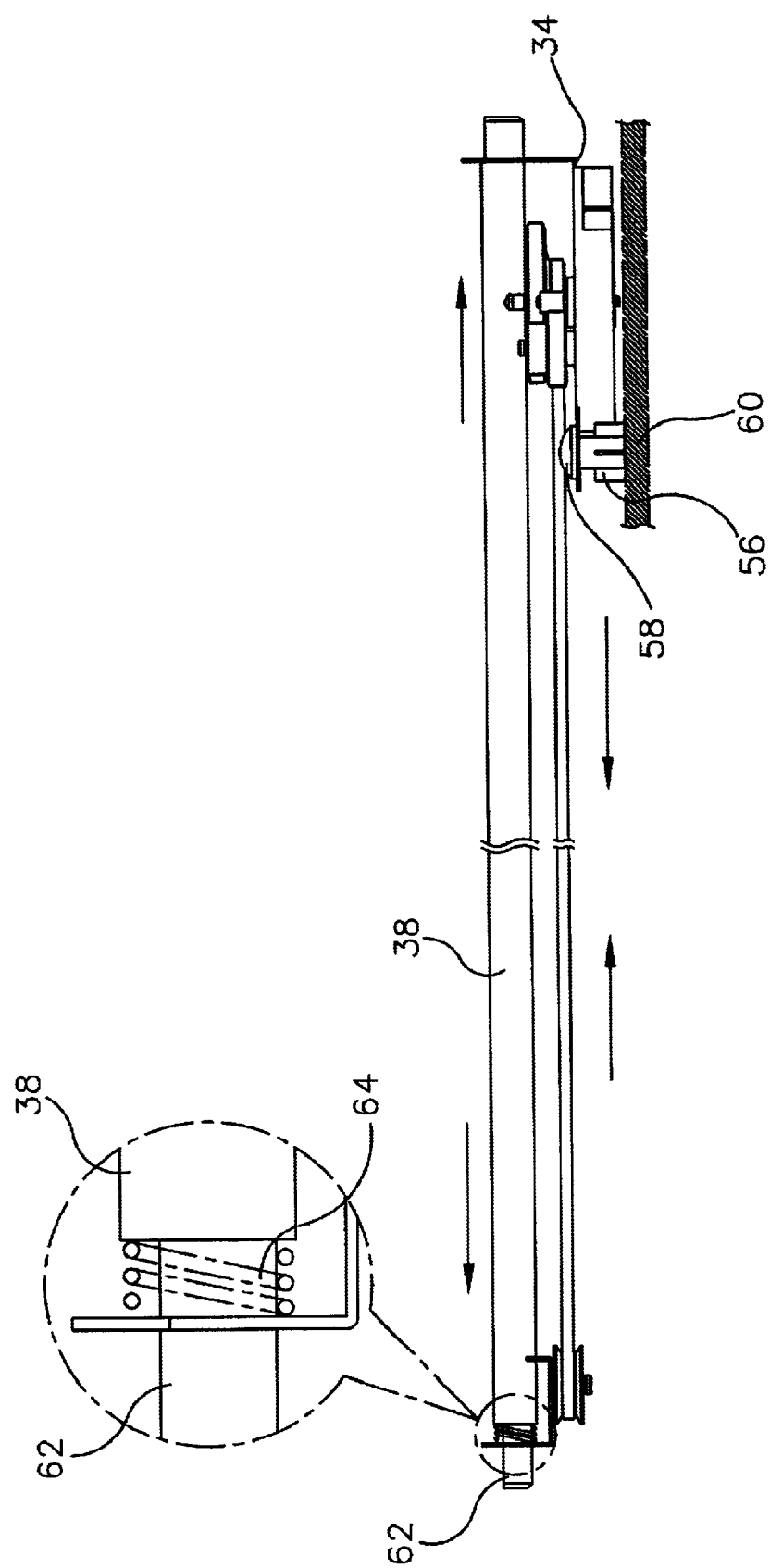
FIG. 7 shows a cross-sectional view and a partly enlarged view of the present invention.

A through hole 54 for singly positioning is formed on the bearing plate 34. A screw seat 56 is fixedly disposed at a position of a scanner bottom seat 60 corresponding to the through hole 54, as shown in FIGS. 6 and 7. A screw 58 penetrates the through hole 54 to fixedly lock the bearing plate 34 on the screw seat 56. When one end of the main transmission shaft 38 penetrates the L-shaped fixing rack 40, the one end of the main transmission shaft 38 away from the bearing plate 34 forms a projective end 62 of a smaller diameter so that part of the projective end 62 protrudes out of the bent portion 42 of the L-shaped fixing rack 40. A spring 64 is sleeved onto the part of the projective end 62 not protruding out of the bent portion 42 to provide a resilient adjustment space for the main transmission shaft 38 when the belt conveyor 50 operates too long to be tight.

In the present invention, because the two ends of the axis of the timing pulley 46 are fixedly positioned, upward and downward motion of the timing pulley 46 can be avoided to enhance transmission stability of tension of the belt conveyor 50 when the timing pulley 46 operates, thereby securing scanning stability of the scanning head. Moreover, the design of increased fixing points of the axis lets the axis not be easily affected by high temperature and deformation of the bearing plate 34, hence not reducing tension of the belt conveyor 50. Therefore, high reliability can be achieved for the scanning quality of image of the scanner. Additionally, because one end of the axis of the timing pulley 46 is fixed on the main transmission shaft 38, part of the force the bearing plate bears can be shared to reduce the force the bearing plate 34 bears. Therefore, fewer screws 58 are required to steadily lock the bearing plate 34 on the scanner bottom seat 60, hence saving the cost of material.

On the other hand, because the slanting conical end 52 is fixed in the conical hole 44, automatic positioning function can be achieved to prevent generation of vibration noise.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A fixing seat of main transmission shaft of a scanner used to drive a scanning head to move, said fixing seat of main transmission shaft comprising:

a main transmission shaft whereon said scanning head can move, a conical hole being formed on a surface of said main transmission shaft; and a timing pulley driven by a power source, a belt conveyor being used to wind around said timing pulley and an idle pulley so as to drive said scanning head to move on said main transmission shaft, an end of an axis of said timing pulley protruding out of a surface thereof forming a slanting conical end, said slanting conical end being fixed in said conical hole.

2. The fixing seat of main transmission shaft of a scanner as claimed in claim 1, wherein said power source is a motor device.

* * * * *